Jan. 19, 1926. 1,570,525
W. H. RIPPIN
DOUGH MOLDING AND LIKE MACHINE
Filed Oct. 11, 1922 2 Sheets-Sheet 1

Jan. 19, 1926.

W. H. RIPPIN 1,570,525

DOUGH MOLDING AND LIKE MACHINE

Filed Oct. 11, 1922   2 Sheets-Sheet 2

Patented Jan. 19, 1926.

1,570,525

UNITED STATES PATENT OFFICE.

WILLIAM HEYCOCK RIPPIN, OF DESFORD, NEAR LEICESTER, ENGLAND.

DOUGH-MOLDING AND LIKE MACHINE.

Application filed October 11, 1922. Serial No. 593,835.

*To all whom it may concern:*

Be it known that I, WILLIAM HEYCOCK RIPPIN, a subject of the Kingdom of Great Britain, residing at "Sunbreak," Desford, near Leicester, in the county of Leicester, England, have invented Improvements in or Relating to Dough-Molding and Like Machines, of which the following is a specification.

This invention comprises certain improvements in dough-molding and like machines, for molding, pressing, and shaping dough or like plastic material into lumps of suitable size and shape, and is related to the invention forming subject of my prior patent No. 1,125,399, granted to me January 19, 1915.

The machine according to said prior patent comprises a rotor disposed within a stator, the rotor being formed with a lower inclined portion to form the molding trough, and the stator being provided with a series of rotatable discs carried upon shafts mounted radially within the stator, these discs having conical or convex faces and serving to stretch and turn the lumps of dough during their rolling passage around the annular molding trough provided between the rotor and the stator.

According to the present invention a dough-molding machine, of the type having a rotor disposed within a stator to provide an intermediate annular molding trough, is furnished with an annular press ram. The latter forms the striker of the stator, is disposed within the stator body, and has a vertically reciprocating movement over and within the molding trough, whereby a downward pressure is intermittently applied to the lumps of dough during their rolling passage around the annular and downwardly tapering or curving molding trough, to thereby set up a combined stretching, turning, folding, rolling, and squeezing action, for the more effective molding, pressing, and shaping of the lumps of dough. Advantageously said annular press ram or striker is carried by the central bearing shaft of the machine, to which is imparted the necessary vertical reciprocation by means of an eccentric or like device actuated from the main driving shaft.

In order that this invention may be clearly understood and readily carried into practice, reference may be had to the appended explanatory sheets of drawings, upon which:—

Figure 3 is a fragmentary sectional elevation illustrating a modified construction of annular press ram or striker.

Figure 1:
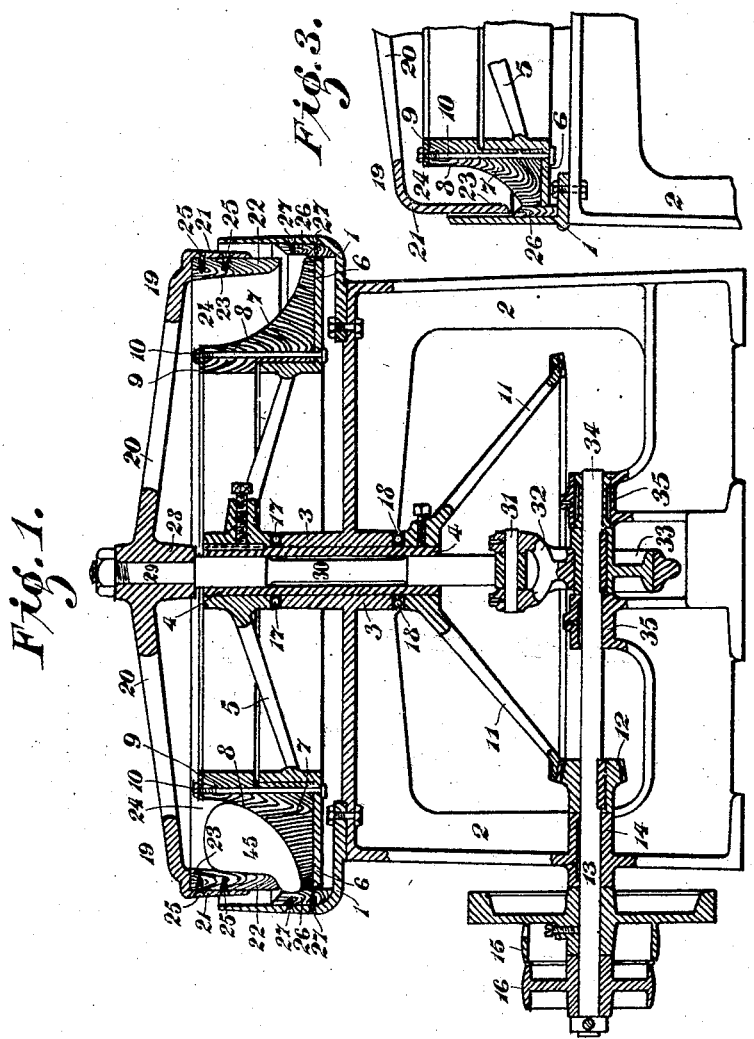
Figure 1 is a sectional front elevation of a dough-molding machine constructed in accordance with the present invention.

In a convenient embodiment of the present invention a stator body member 1 of annular configuration in plan and of substantially L-shape in cross-section is mounted horizontally upon an upstanding underframe 2 advantageously of a four-armed construction. The upper part of this fixed underframe 2 is formed with a central vertical boss 3 projecting upwardly and downwardly in alignment with the axis of the stator, and within this boss 3 is rotatably mounted a bearing sleeve 4 projecting both from the top and bottom of the boss, the upper projecting end of this sleeve 4 having fixed thereon the wheel-like frame of the rotor 5, which is disposed concentrically within the stator. The outer or annular part 6 of this rotor frame is of substantially L-shaped cross-section, and within the exterior angle of this annular L-shaped part 6 is fitted the inclined portion of the rotor, advantageously built up in wooden sectors 7 of an upwardly and outwardly concave formation at 8, renewably secured in position by means of a superposed ring member 9 and by an annular series of bolts 10 passing vertically through said ring member, through the series of sectors, and through the base of the L-shaped rim 6 of the rotor. The lower projecting end of the sleeve 4 has fixed thereon a large bevel gear wheel 11, advantageously of a conical form, which bevel wheel 11 is geared to a bevel pinion 12 mounted on a main driving shaft 13, which latter is rotatably mounted in horizontal bearings 14 provided in the lower part of the underframe 2, and is fitted externally of the underframe with fast and loose driving pulleys 15, 16. Suitable ball thrust bearings 17 and 18 are interposed between the central bearing boss 3 of the underframe 2 and the rotor 5 and its bevelled driving wheel 11 respectively.

The construction as so far described is more or less similar to that set forth in the specification of my aforementioned prior patent.

The stator is of a two-piece construction, comprising the annular L-shaped body member 1 already described, and a superposed annular press ram or striker 19 disposed concentrically and slidably therein. This annular press ram or striker 19 comprises a central wheel-like frame part 20 and a downward annular flange part 21 fitted loosely within the upturned part of the L-shaped body 1 of the stator, and within this downturned flange 21 is fitted a complementary annular series of wooden sectors 22, Figure 1, suitably inclined on their inner annular face 23, in opposition to the concave annular face 8 of the rotor, to complete the annular molding trough 24 of the desired cross-sectional form. This annular series of ram sectors 22 may be renewably fixed in position by screws 25 passing through the downturned flange 21 of the annular press ram or striker 19, or said downturned flange 21 may be of such an internal configuration, see Figure 3, as to dispense with the necessity for said sectors. The interior angle of the L-shaped body member 1 of the stator is likewise fitted with an annular series of wooden sectors 26, renewably secured by screws 27 or the like, to complete the annular molding trough 24 to the desired cross-sectional shape at its lower reduced extremity. The wheel-like frame 20 of the annular press ram or striker 19 is formed with a central boss 28 which is fixedly mounted upon the reduced upper extremity 29 of a central bearing shaft 30 which extends slidably through the central bearing sleeve 4 of the rotor, the lower projecting extremity of this sliding shaft 30 being apertured transversely to receive a pin 31 which provides a connection to the upwardly projecting forked arm 32 of an eccentric device 33 which is mounted on an inward extension 34 of the horizontal main driving shaft 13, this inward shaft extension 34 being carried in supplemental bearings 35 provided on the lower interior part of the underframe 2.

As the main driving shaft 13 is rotated therefore, to drive the rotor 5, a vertical reciprocating movement is simultaneously imparted to the central vertical bearing shaft 30, which vertical reciprocating movement is transmitted to the annular press ram or striker part 19 of the stator, located slidably and concentrically over and around the annular molding trough 24. The extent of this vertical reciprocating movement of the annular press ram or striker 19 may be of course regulated by varying the throw of the eccentric device 33 upon the main driving shaft.

The annular molding trough 24 as described is provided with inlet and discharge openings 36 and 37 at adjacent points in the periphery of the stator, the inlet opening 36 being formed by cutting away the annular press ram or striker part 19 of the stator as shown at 38, and the discharge opening 37 being formed by cutting away as shown at 39 the upright peripheral part of the annular L-shaped body member of the stator to the desired extent to the level of the rotor base. A fixed partition block 40 having a curved guide surface 41 on its discharge side is interposed between said inlet opening 36 and discharge opening 37.

Figure 2:
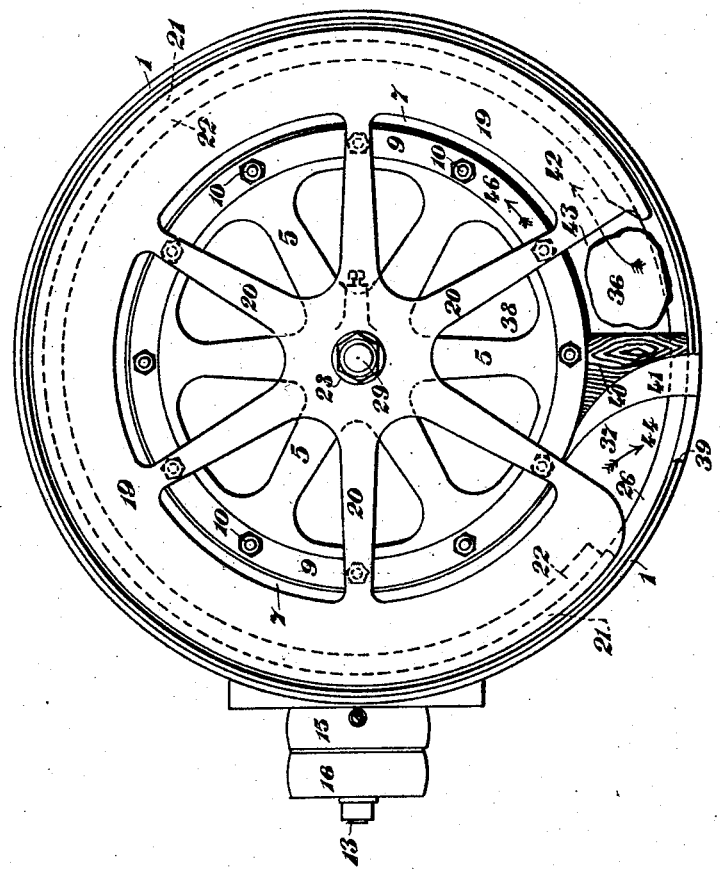
Figure 2 is a plan of the machine illustrated in Figure 1.

The rough lump of dough, fed into the annular molding trough 24 in the direction of the arrow 42 by way of the inlet opening 36, is indicated at 43, Figure 2, whilst the lump as pressed and molded in the trough, for discharge in the direction of the arrow 44 by way of the discharge opening 37, is indicated at 45, Figure 1. The direction of rotation of the rotor 5 is indicated by the arrow 46, Figure 2.

What I claim as my invention and desire to secure by Letters Patent is:

1. A dough molding or like machine, having an annular rotor, an annular stator within which the rotor is disposed to provide an intermediate annular molding trough, an annular press ram in forming the striker part of the stator and also disposed within the stator body and adapted for vertically reciprocating positive and unyielding movement over and within the molding trough.

2. A machine in accordance with the preceding claim, wherein a central bearing shaft of the machine is provided by which said annular press ram or striker is carried, and wherein a main driving shaft is also provided, together with means, actuated by said driving shaft, to impart vertical reciprocating movement to said central shaft.

3. A machine in accordance with claim 1, wherein said annular press ram or striker embodies a depending annular flange which is slidable loosely within the body part of the stator and is adapted to cooperate with shaped renewable sectors fitted within the exterior angle of the rotor frame and within the interior angle of the stator body.

4. A dough molding or like machine, having an annular rotor, an annular stator within which the rotor is disposed to provide an intermediate annular molding trough, an annular press ram forming the striker part of the stator and also disposed within the stator body and adapted for vertically reciprocating positive and unyielding movement over and within the molding trough, said annular press ram or striker embodying a depending annular flange slidable loosely within the body part of the stator and arranged to cooperate with shaped renewable sectors fitted within the exterior angle of the rotor frame and within the interior angle of the stator body, said depending annular flange being also fitted with shaped renewable sectors.

In witness whereof I have hereunto set my hand.

WILLIAM HEYCOCK RIPPIN.